Oct. 15, 1968  W. E. DAVIS ETAL  3,405,813
CONVEYOR FOR TOBACCO STITCHER AND LOOPER MECHANISM
Original Filed Aug. 13, 1963  12 Sheets-Sheet 1

INVENTORS
William E. Davis
Charles M. Davis

BY

ATTORNEYS

Oct. 15, 1968  W. E. DAVIS ET AL  3,405,813
CONVEYOR FOR TOBACCO STITCHER AND LOOPER MECHANISM

Original Filed Aug. 13, 1963  12 Sheets—Sheet 2

FIG. 1A.

INVENTORS
William E. Davis
Charles M. Davis

BY *Hall, Pollock, & Vande Sande*

ATTORNEYS

Oct. 15, 1968  W. E. DAVIS ET AL  3,405,813
CONVEYOR FOR TOBACCO STITCHER AND LOOPER MECHANISM
Original Filed Aug. 13, 1963  12 Sheets-Sheet 3

INVENTORS
William E. Davis
Charles M. Davis

BY  *Hall, Pollock, & Vande Sande*

ATTORNEYS

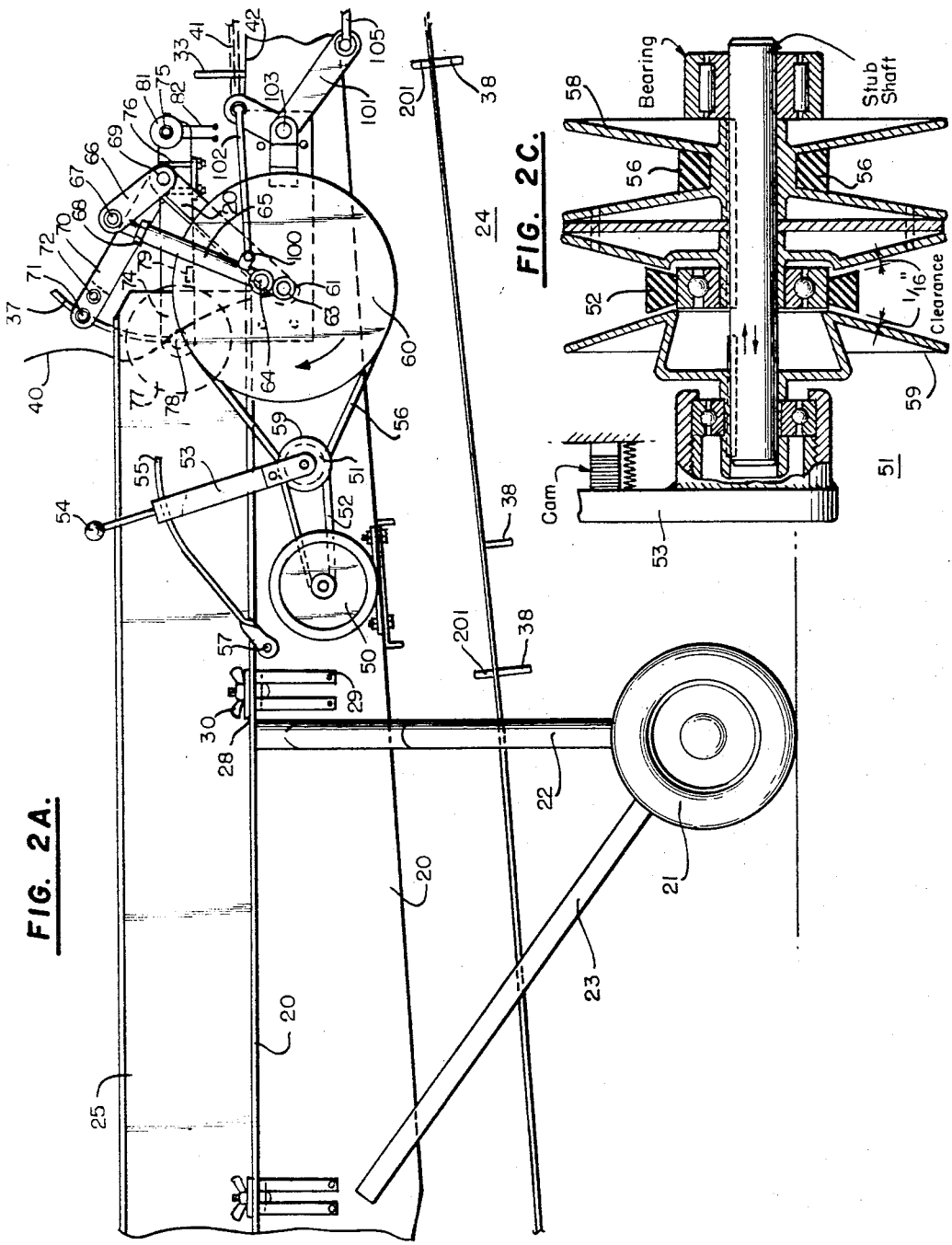

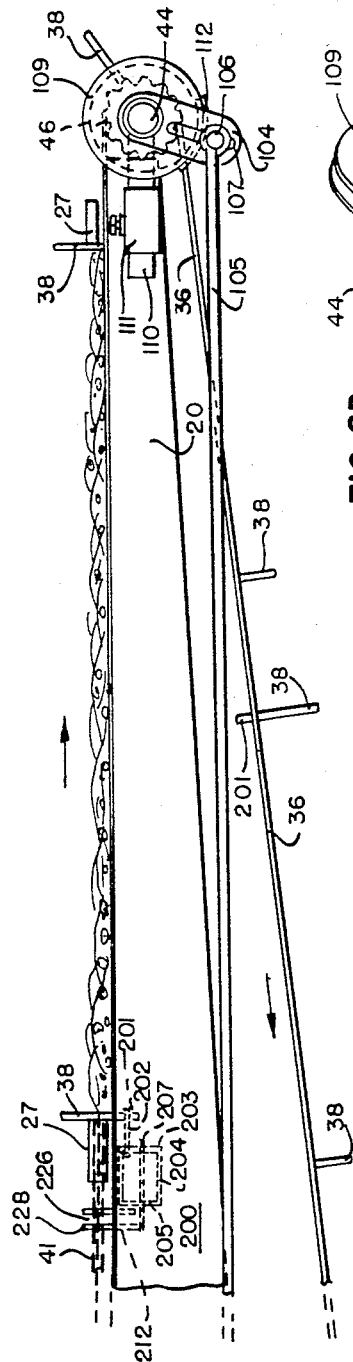
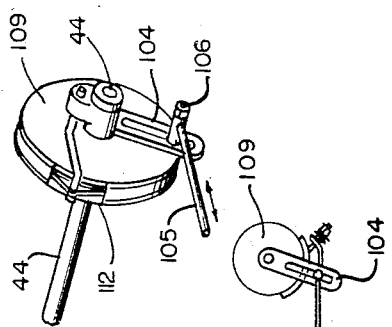
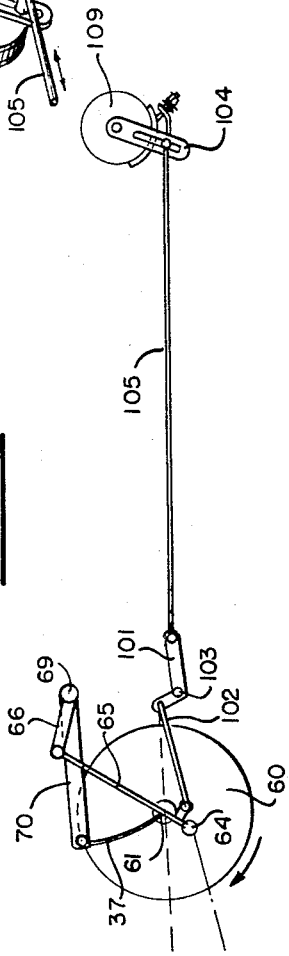

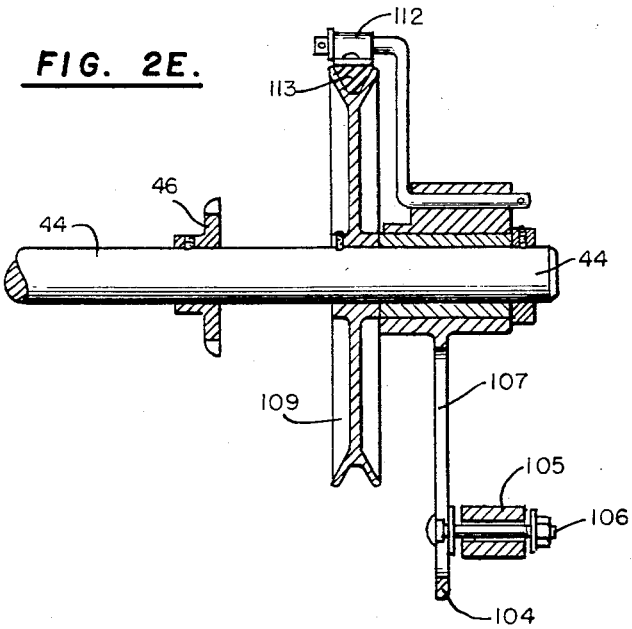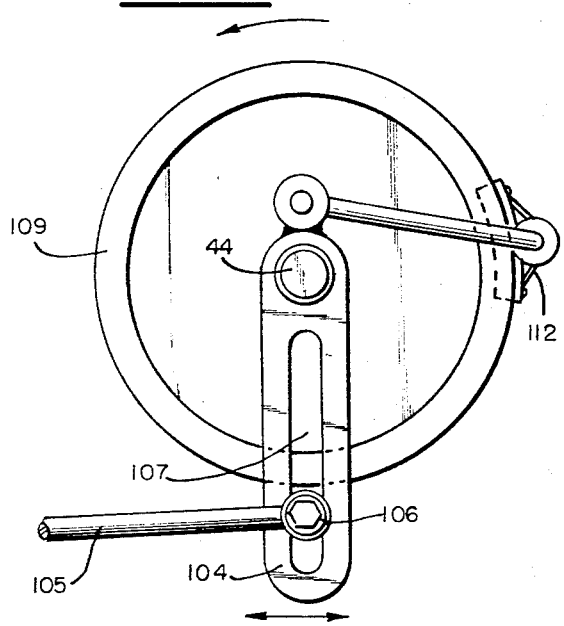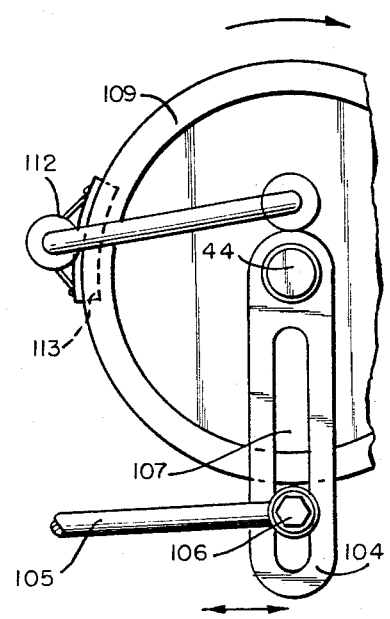

INVENTORS
William E. Davis
Charles M. Davis

BY Hall, Pollock, & Vande Sande

ATTORNEYS

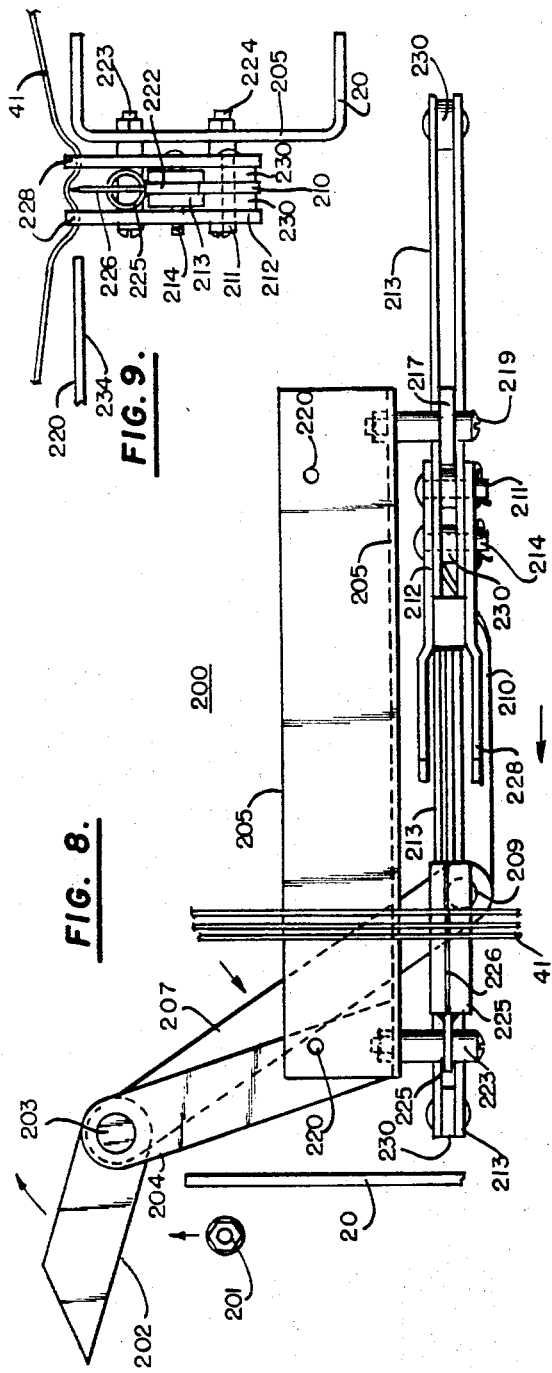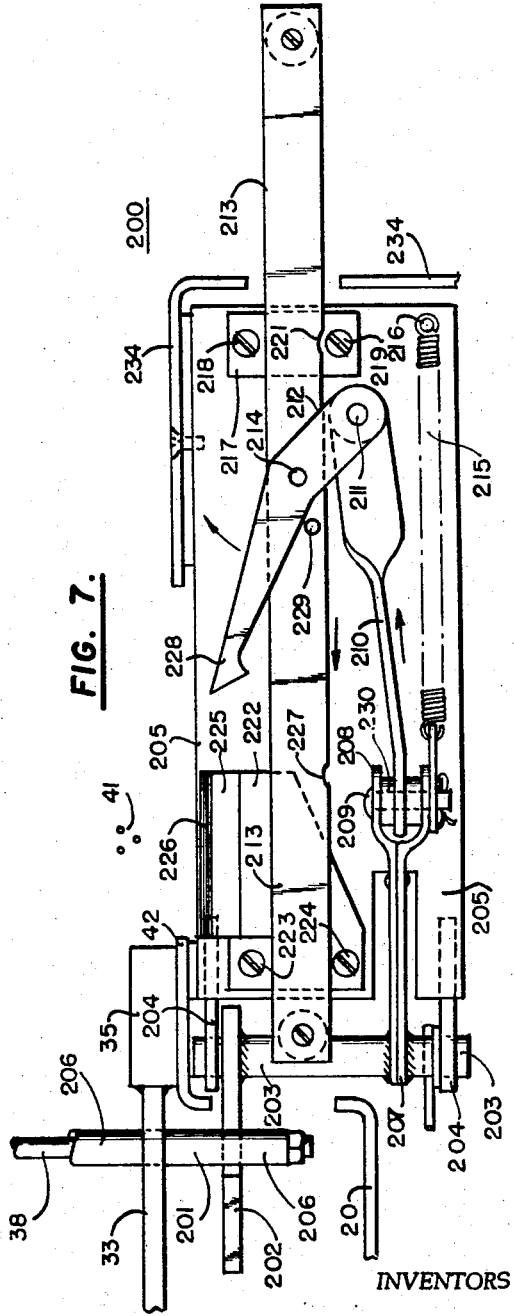

INVENTORS
William E. Davis
Charles M. Davis

ATTORNEYS

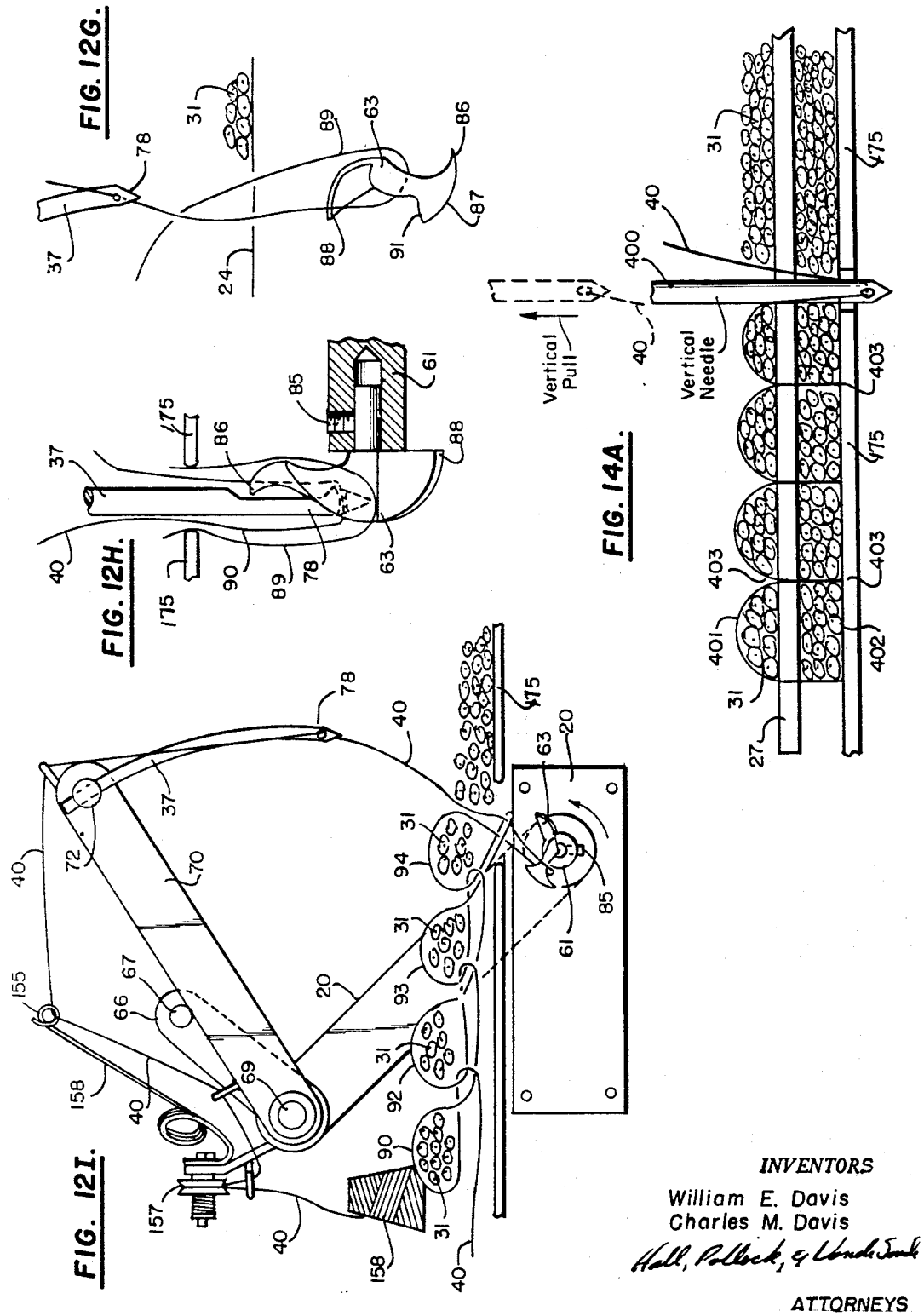

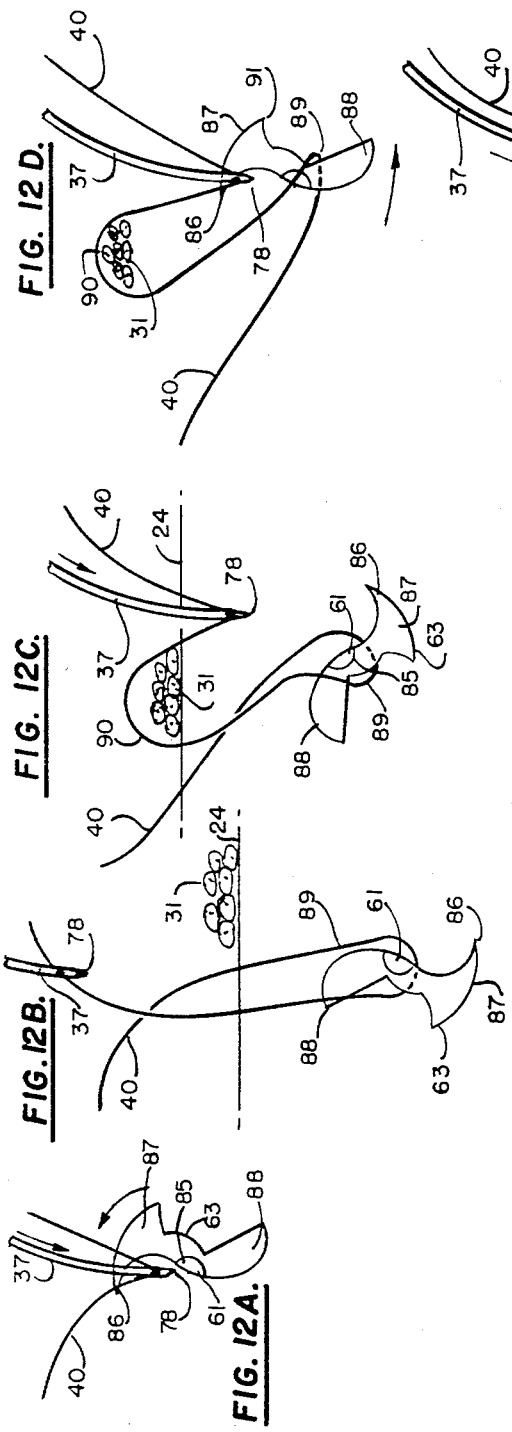
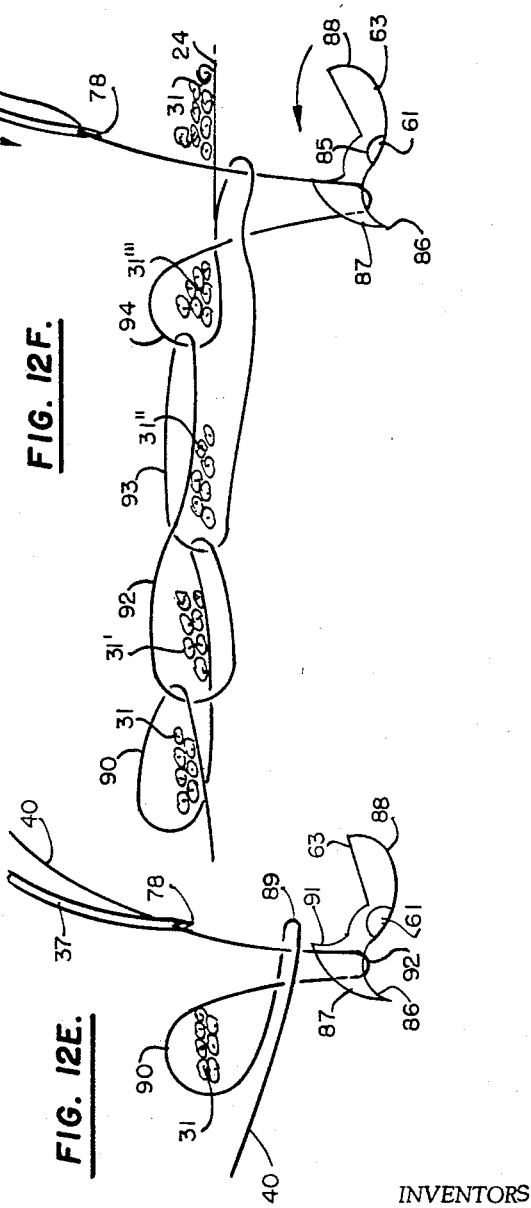

INVENTORS
William E. Davis
Charles M. Davis

BY Hall, Pollak, & Vande Sande

ATTORNEYS

United States Patent Office 3,405,813
Patented Oct. 15, 1968

3,405,813
CONVEYOR FOR TOBACCO STITCHER AND
LOOPER MECHANISM
William E. Davis and Charles M. Davis,
both of Seven Springs, N.C. 28578
Original application Aug. 13, 1963, Ser. No. 301,862, now Patent No. 3,263,826, dated Aug. 2, 1966. Divided and this application Oct. 24, 1965, Ser. No. 510,440
5 Claims. (Cl. 214—5.5)

ABSTRACT OF THE DISCLOSURE

The specification discloses a tobacco stitching and looping mechanism adapted to loop tobacco leaves by means of a stout string and form the tobacco into bundles of leaves.

In particular, the specification discloses a mechanism for intermittently advancing the leaf conveyor to allow for the operation of the stitching mechanism during the dwell periods of the intermittently advancing conveyor.

---

This application is a division of my co-pending application Ser. No. 301,862, filed Aug. 13, 1963, issued Aug. 2, 1966 as Patent No. 3,263,826 and entitled "Tobacco Stitcher and Looper Mechanism."

The present invention relates to a tobacco stitching and looping mechanism for use in the field as part of a tobacco harvester or for use in the barn or other fixed location to which piles of harvested tobacco leaves may be brought for the looping step in the harvesting of tobacco. Looping comprises stringing or stitching tobacco leaves by means of a stout string which is looped around the stems of bundles of leaves or stitched or sewed through the tobacco stems so that leaves hang down in a draped-depending position with their stems up.

Reference is made to U.S. Patents Nos. 2,715,968 granted Aug. 23, 1955, for "Tobacco Harvester"; 2,786,585 granted Mar. 26, 1957, for "Tobacco Harvesters"; and 2,954,132 granted Sept. 27, 1960, for "Tobacco Harvester with Automatic Looping Mechanism"; each being granted to W. E. Davis for Tobacco Harvesters employing stitching mechanisms for looping tobacco leaves on drying sticks. The present invention is a variant of the above patented inventions and is intended to achieve a similar result by use of a composite conveyor belt and chain to replace spring-pressed clips on a chain. Where, for example, a raised platform is not used, conveyor chains or belts are not required to convey the harvested leaves from the primer to the looper on a raised platform. The conveyor belt and chain for feeding the leaves to the stitching mechanism may then be substantially horizontal. Such a construction is particularly applicable to stationary operation as in a barn. Although for field harvesting the automatic stitching mechanism with conveyor chain as disclosed in the first two of said patents, listed above, is preferred; the looping mechanism of the present invention may be installed on the raised platform and supplied with leaves from the primers by conveyor chains having spring-pressed clips. Such a machine could be used both in the field and in the barn, particularly if the looper mechanism is readily removable. The fully automatic machines of the above patents can also be used with good results in the barn, but they are most effective in the field where they can produce fully strung tobacco sticks with a minimum of labor because each primer strings his own sticks and the harvester moves so slowly along the rows that the driver has ample time to tie off full sticks, rack them and put a new stick in place for the stringing of additional leaves.

It is an object of the invention to provide a looping mechanism for leaf tobacco which utilizes a curved needle mounted on a pivoted arm such that the entire length of the needle traverses an arc of a circle. This construction prevents tearing of the tobacco leaf and eliminates any need for a crosshead slide mounting and a heavy housing, so that the weight of reciprocating parts and the resulting vibration is reduced.

It is an object of the invention to provide a looping mechanism for leaf tobacco which is free of sliding parts.

It is an object of the invention to provide a composite conveyor comprising a belt and chain which can be run slack and operate in positive alignment without slipping.

It is an object of the invention to provide a novel needle guard which may be used to control starting and stopping of the looping mechanism at any instant and to initiate a looping cycle.

It is an object of the invention to provide a tobacco looping or stitching structure which pulls the stitched bands or groups of leaves together to leave a rounded bottom for each stitch, providing a greater area of exposed leaf so that the central leaves dry more evenly and more quickly. It has been found that a straight reciprocating head needle leaves the stitched tobacco with flat bottom profile such that in drying air, even when heated, does not penetrate through to the central part of the tobacco looped within a stitch. As a result, tobacco on one side of a looped stick does not dry as fast as on the other side because of the difference in the amount and shape of the exposed area. By use of a curved needle which penetrates the tobacco on an arcuate path, the loop end of each stitch is pulled at an angle to a point above midway into the tobacco, leaving the bottom of each stitch rounded. This effect is achieved by the angular pull of the thread or twine on the loop as the needle approaches its raised position and exerts a sidewise pull on the stitch which draws the knot tight and simultaneously rounds each stitch. This effect is not obtainable with a vertical needle.

It is an object of the invention to increase tolerances of machine manufacture, to decrease manufacturing cost, increase operating life, and provide quiet machine operation by the use of Teflon anti-friction bearings or neoprene coatings or resilient washers at friction and pivot points in the machine.

In the several figures of the drawing like numerals refer to like parts throughout.

In the drawings:

FIGURE 1 is a perspective view of one form of the apparatus according to the invention;

FIGURES 1A and 1B comprise a plan view of a part of a looper mechanism according to the invention;

FIGURES 2A and 2B comprise a side elevation of FIGURE 1;

FIGURE 2C is a detail of the variable drive;

FIGURE 2D is a modified form of the conveyor advancing mechanism;

Figure 1:
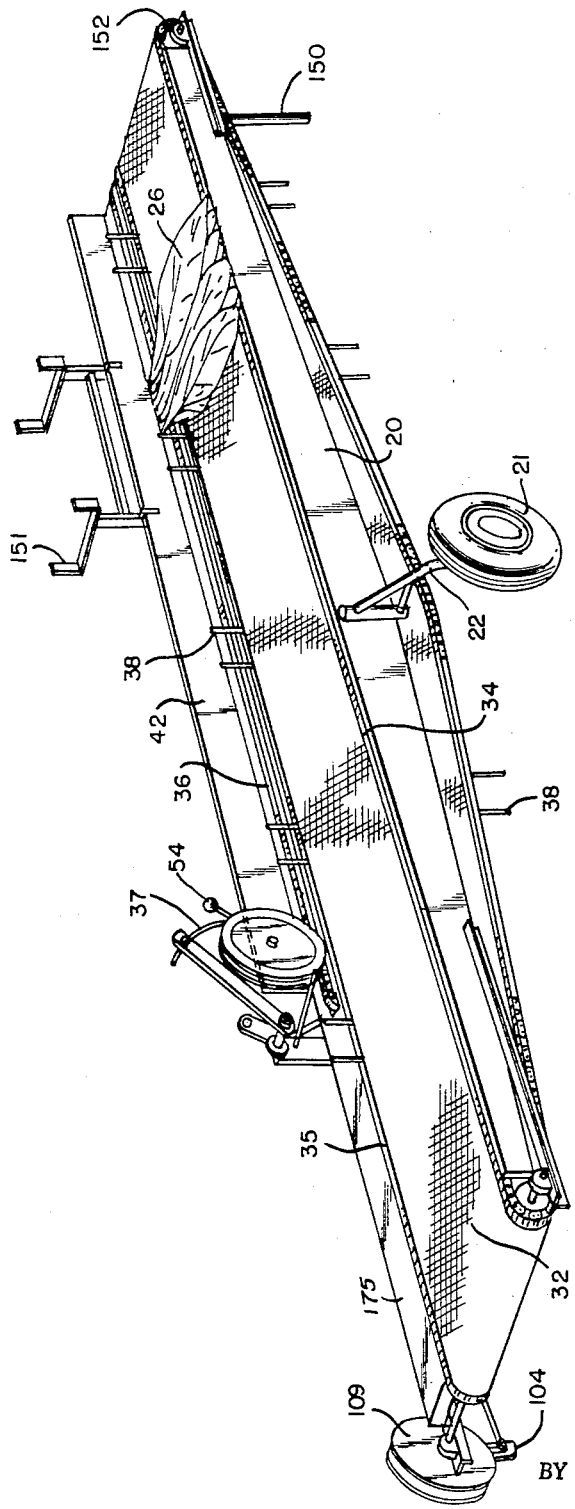
Figure 3:
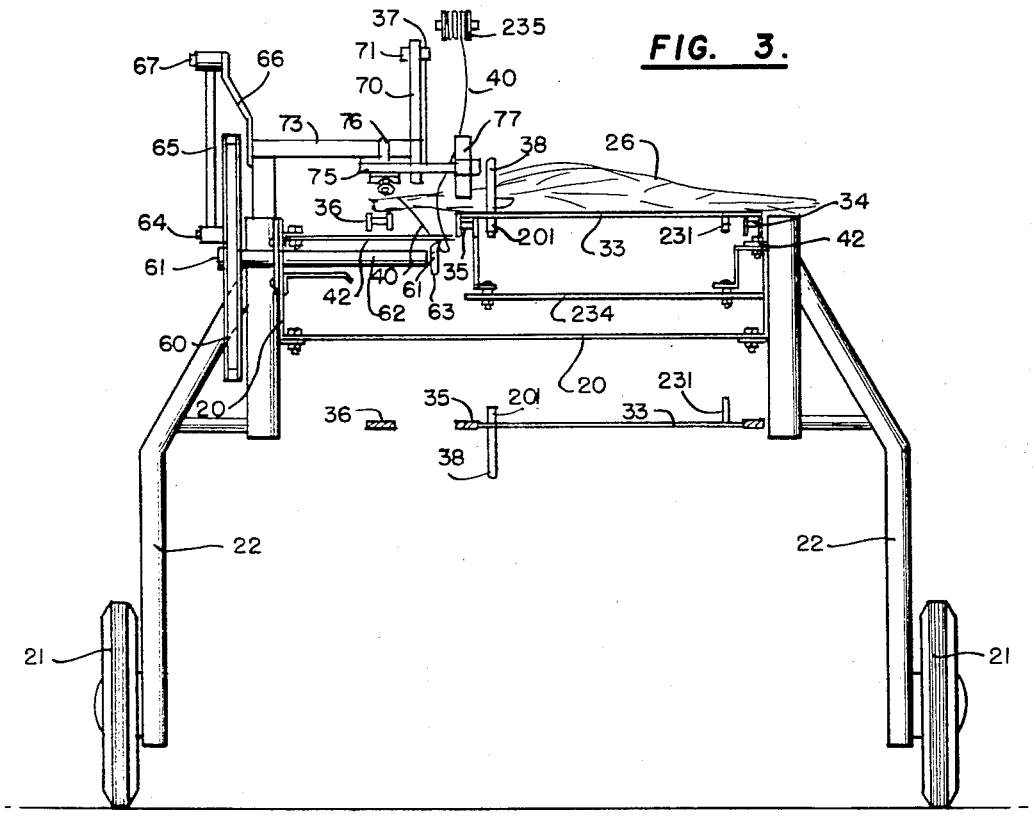
Figure 4:
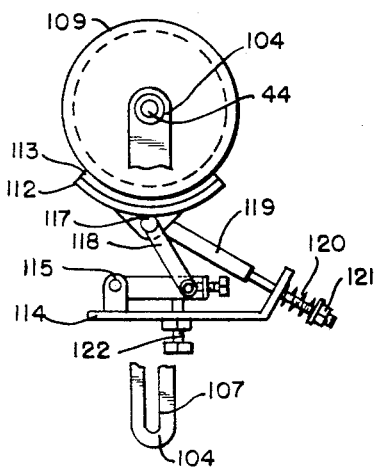
Figure 5:
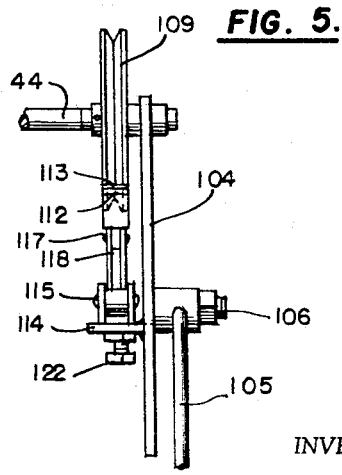
Figure 10:
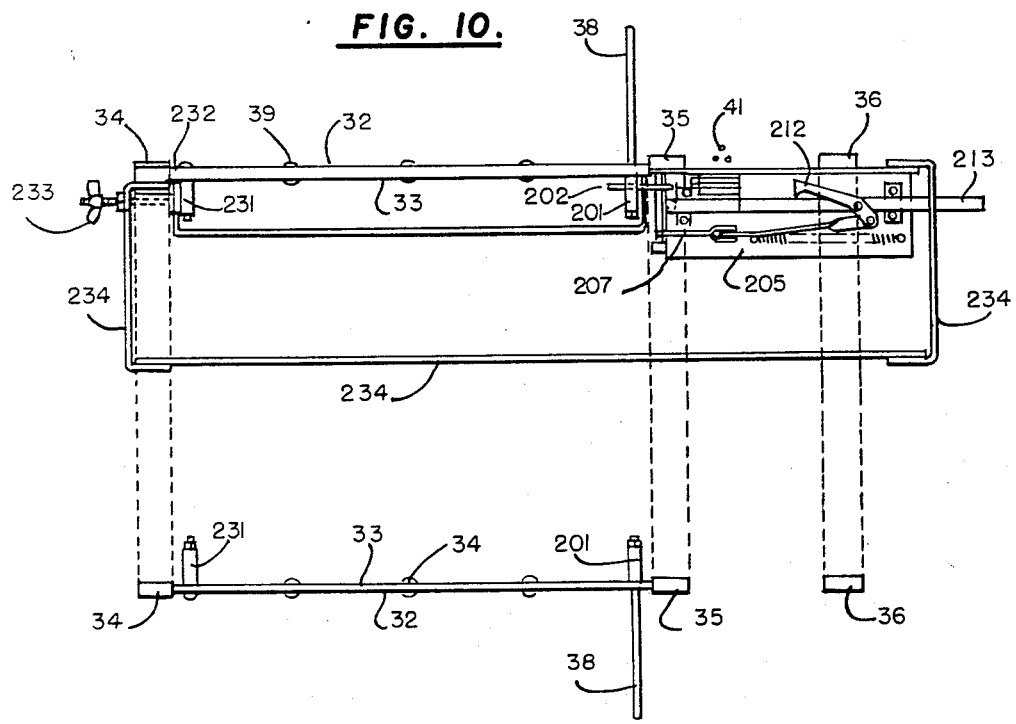
Figure 11:
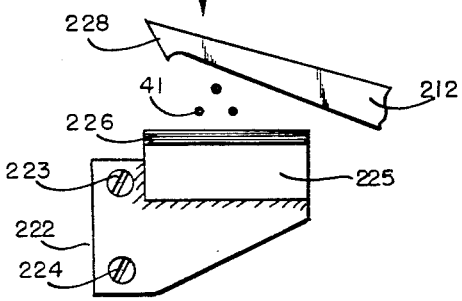
Figure 11A:
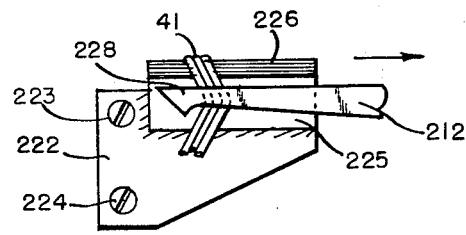

FIGURES 2E–G are different views of FIGURE 2D;

FIGURE 3 is a schematic partial section of FIGURES 1 and 2;

FIGURE 4 is a detail side view of part of the drive mechanism of FIGURE 2 with parts broken away for clarity;

FIGURE 5 is an end view of FIGURE 4;

FIGURE 6 is a schematic view of certain of the linkage arrangement to provide kinematically the delay in conveyor motion for the stitching operation;

FIGURE 7 is a side elevation of one form of twine cutter according to the invention;

FIGURE 8 is a plan view of FIGURE 7;

FIGURE 9 is a fragmentary section showing the twine cutter;

FIGURE 10 is a sub-assembly elevation of the twine cutter in position in the looping mechanism;

FIGURE 11 is a schematic detail of the cutter in operation;

FIGURE 11A is a schematic detail of the cutter in operation subsequent to the showing in FIGURE 11.

FIGURES 12A–12F are schematic step-by-step showings of the bobbin and needle stitching or looping tobacco according to the invention.

Figure 14B:
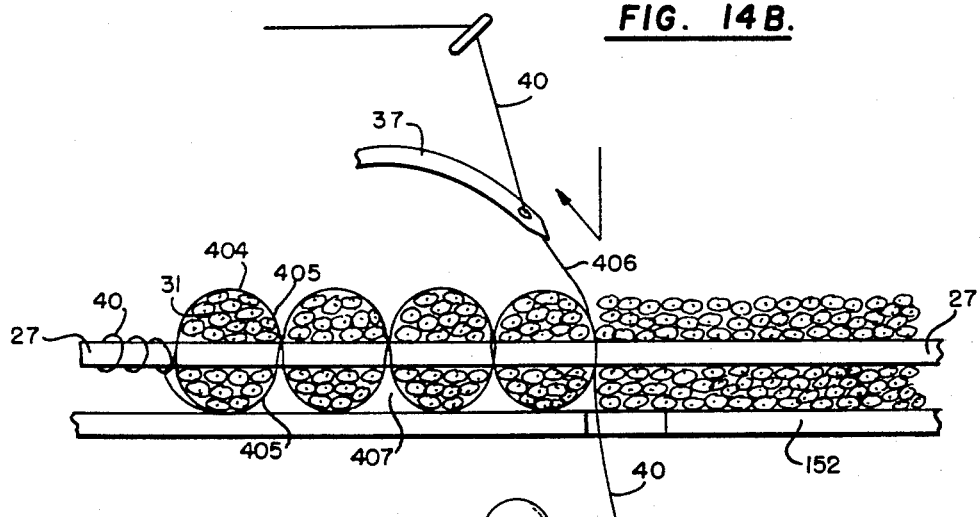
Figure 13:
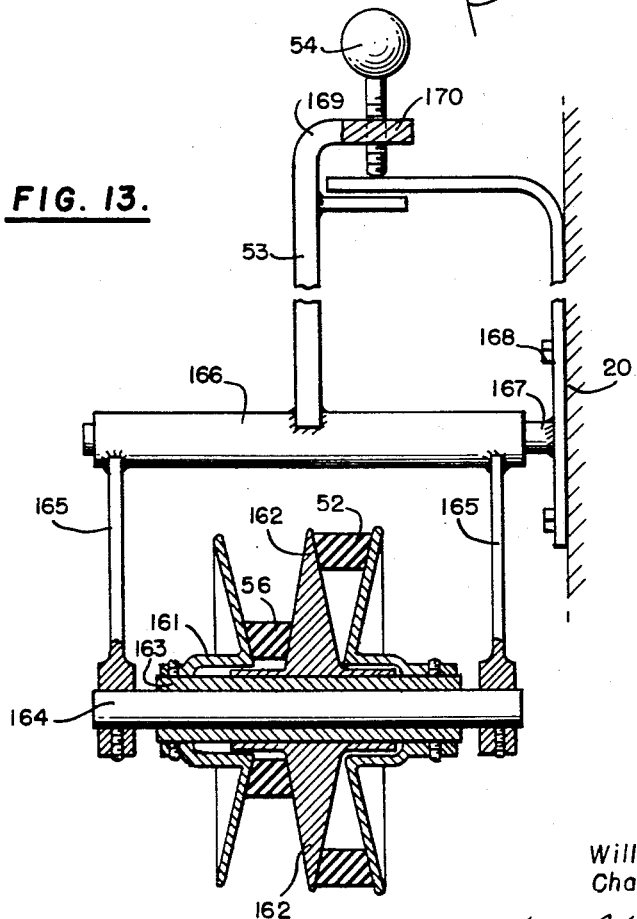

FIGURES 12G–I are schematic showings of the mounting of the bobbin on the semi-circular end of its shaft with an adjustment set screw;

FIGURE 13 is a detailed sectional view of another form of variable drive for use with the invention;

FIGURE 14A is a section showing the looping of tobacco leaves with a straight vertical needle; and FIGURE 14B is a section showing the looping of tobacco leaves with a curved needle providing a side pull allowing air to flow.

A frame member 20 is supported on wheels 21 by struts 22 which are braced as at 23. Frame 20 mounts a composite belt conveyor assembly 24 which runs alongside a backboard 25 against which the stems of tobacco leaves 26 are gauged or aligned so as to even them and position the stems for stitching or looping above tobacco sticks 27 from which they will hang in draped-depending condition on alternate sides of the sticks 27 with their stems when racked and hung in the barn for drying and curing. The position of backboard 25 can be adjusted to vary the length of stem 31 extending above the sticks 27 by means of slides 28 in guides 29 and thumb nuts 30.

Composite conveyor 24 comprises a fabric or plastic webbing belt 32 carried by cross bars 33 mounted on link chains 34 and 35. Belt 32 supports and prevents damage to the tobacco leaves 26. Belt 32 is run slack and is removably secured by snaps or fastening holes 39 to cross bars 33. Rivets may be upset in holes 39 to hold belt 32 in position. Not being under tension, belt 32 has a long life, may be replaced in sections as wear or damage may require, and does not require a massive frame as do belts under substantial tension. Frame 20 may, accordingly, be designed and built as a support for the apparatus rather than as a machine element under heavy load in compression. A third conveyor chain 36 is spaced from chain 35 and supports the stem end 31 of the leaves 26. The leaves 26 individually or as bundles are stitched at their stems 31 between chains 35 and 36 by a curved needle 37. This is readily accomplished by laying leaf bundles or leaves 26 side by side on conveyor 24 with their stem ends 31 against backboard 25. The bundles of leaves 26 may be placed side by side or spread out as desired, for better curing results. A tobacco stick 27 is then laid over this first layer of leaves 26 and up against guide posts 38 carried by cross bars 33, closely adjacent or contiguous to chain 35. The sticks 27 are preferably positioned so that their respective ends are spaced a few inches apart at about the middle of the space between consecutive guide posts 38. When a stick 27 is in position overlying a first layer of bundles or leaves 26, a second layer is placed on top of the stick 27 in the same manner as the first layer. As conveyor 24 carries the leaves 26 and the stick 27 past needle 37 the two leaf layers, one on each side of the stick 27, are stitched together at their stems 31 between chains 35 and 36. When a stick 27 is full the stitching or tying cord 40 is tied off and cut. Cord 40 is formed into chain stitches 41 which bind the stems 31 so that when a full stick 27 is lifted from conveyor 24 the looped leaf bundles 26 hang down on both sides of the stick 27 in draped-depending position with their stems up. These full sticks may be racked immediately or laid out in orderly piles for hanging at the end of a run and subsequent curing.

Composite conveyor 24 rides on the top smooth surface 42 of frame 20 on which belt 32, chains 34, 35 with their cross bars 33 and chain 36 slide with so little frictional drag that rollers are not required under plastic belt 32 even when there is heavy gumming from the harvested leaves. Both the conveyor assembly 24 and the surface 42 may be coated with plastic such as Teflon so that gumming is minimized.

Belt 32 is carried by cross bars 33 around end roller 43 mounted on shaft 44 which also carries sprocket 45 for chain 34, sprocket 46 for chain 35 and sprocket 47 for chain 36. The sprockets and chains are provided to prevent slipping and to maintain positive alignment The slack composite belt arrangement allows the use of a light construction for frame 20 which would have to be very heavy to limit deformation to acceptable tolerances if it had to support the force required to apply sufficient tension to a flat belt such as 32 to prevent slippage, especially in wet weather when the tobacco leaves are wet.

The looper apparatus is powered by motor 50 which drives variable speed transmission unit 51 through belt 52. Unit 51 may be of double mating cone construction with a movable friction drive member between the cones which may be shifted along the axes of the cones by lever 53 with a set screw control knob 54 which can be locked in position on arcuate member 55 to provide a selected speed output to belt 56. Member 55 is fixedly mounted on frame 20 at 57. Variable speed transmission may take the form of dual pulleys 58 and 59. Pulley 59 is provided with diverging walls and is about twice the width of the belt 56 which it drives. Lever 53 when rotated by control knob 54 moves the belt higher or lower on the flared flange of pulley 59, thereby varies its effective diameter and changes the speed of belt 56. Stepped pulleys may be used. Pulley 59 is normally held in a belt engaging position by a magnetic particle clutch (not shown). As will be hereinafter more fully explained, when the needle guard wheel is raised, dog clutch 81 de-energizes the particle clutch and the two halves of pulley 59 spread to the position shown in FIGURE 2A to prevent the transmission of power to the pulley 60 and the needle drive linkage.

An alternate form of variable drive is shown in FIGURE 13 in which belts 52 and 56 bear on flared pulley halves 160 and 161, respectively. Both belts ride on double-cone sliding center 162. Bushing 163 is rotatably mounted on rod member 164. Roller bearings may be supplied if desired. Pulley halves 160 and 161 are keyed to bushing 163 or fastened by suitable set screws. Rod 164 is mounted in the ends of arms 165 which are in turn mounted on bushing 166 which turns on rod 167 suitably mounted on frame 20 as at 168. In FIGURE 13, set screw control knob 54 on lever 53 can be locked in position on an arcuate member 170 similar to member 55 and attached to frame 20 by arm 169.

As lever 53 is moved counter-clockwise, belt 52 is tightened and belt 56 is loosened, forcing sliding center member 162 to the left and increasing the speed of belt 56. As lever 53 is moved clockwise, belt 56 is tightened and belt 52 is loosened, decreasing the speed of belt 56. When conveyor assembly 24 is advancing at a desired rate knob 54 is tightened to lock lever 53 in position.

Belt 56 drives large pulley 60 and shaft 61 in the direction shown by the arrow. Shaft 61 is journalled in bearing 62 mounted on frame 20 below surface 42 and carries bobbin 63 on its inner end at the stitching or looping position between chains 35 and 36. Pulley 60 carries crank pin 64 which actuates adjustable connecting rod 65 for the activation of arcuate needle 37. Connecting rod 65 is connected to lever 66 at pivot 67 and is adjustable in length as at 68 to vary the angular position of lever 66, of shaft 69 to which it is keyed and of needle arm 70, to provide adjustment for depth of stroke of needle 37 which is removably mounted on 71 near the free end of arm 70.

Needle 37 is mounted to coincide with an arc of a circle about shaft 69 the radius of which is the effective length of needle arm 70. One of the features of the invention is this construction for mounting a curved needle, so that it penetrates the tobacco 26 with minimum or zero motion of translation and pierces a clean hole through the tobacco with a minimum of tearing of the leaf. An adjustment of needle 37 for proper clearance with bobbin 63 is provided at 72. Shaft 69 is journaled in bearing 73 carried by frame 20 and mounts needle arm 70 at its inner end. A guard arm 74 is pivoted on stub shaft 80 in bearing 75 mounted by U-bolt 76 on bearing 73. Guard arm 74 carries a rotatable guard wheel 77 which cooperates with back board 25 to cover the pointed threaded end 78 of needle 37 during the looping operation. Guard wheel 77 and arm 74 may be rotated upwardly to expose the end 78 of needle 37 for threading or inspection. Guard arm 74 is provided with a projection 79 for engaging the needle arm 70 when guard wheel 77 is raised and needle point 78 is exposed. A dog clutch 81 locks shaft 80, guard arm 74 and needle arm 70 against downward movement when guard wheel 77 is raised to expose point 78. Dog clutch 81 incorporates an electric switch having terminals 82 which is in the circuit 83 controlling magnetic particle clutch 84 on pulley 59. When dog clutch 81 is engaged, the switch opens circuit 83 and a magnetic particle clutch 84 (not shown) mounted on the transmission 51 stub shaft is de-energized so that pulley 59 turns freely on its shaft and transmission 51 cannot deliver any power to actuate needle 37. When dog clutch 81 is released and guard arm 74 is lowered so that guard wheel 77 covers needle point 78, the switch in circuit 83 is closed, energizing magnetic particle clutch 84 which drives pulley 59 to actuate needle 37. It will be seen that guard arm 74 and dog clutch 81 provide a safe and effective means for starting and stopping operation of the looping mechanism and for initiating a looping cycle when a stick 27 is covered with an upper layer of leaf bundles 26.

Bobbin 63 on shaft 61 and needle 37 on shaft 69 operate on what may be termed a 1:1 ratio because needle 37 goes through a complete cycle of arcuate motion for every complete rotation of bobbin 63. This arrangement greatly simplifies timing of the mechanism without any need for timing gears, cam shafts, timing chains or the like. Bobbin 63 is removably mounted on the inner end of shaft 61 and held in place by a set screw 85. To time the mechanism it is only necessary to loose set screw 85 and rotate bobbin 63 by hand until the point 86 of the bobbin hook 87 engages the tying cord or twine 40 at the eye 78 of needle 37. Set screw 85 is then tightened and the looping parts are ready to operate in synchronism. The above construction permits the looping mechanism to operate at higher speeds than would otherwise be possible because of the light weight of the moving parts and the arcuate path of the needle assembly. Vibration is minimal. The advancing mechanism for conveyor 24 is driven from connecting rod 65 which has mounted thereon near shaft 64, a pivot 100 to which bell crank 101 is connected by link 102. Bell crank 101 is pivoted on frame 20 at 103 and transmits reciprocating motion to an arm 104 through link 105 which is adjustably connected to arm 104 by a bolt 106 movably mounted in slot 107 to vary the throw of arm 104. Arm 104 is pivoted freely on shaft 44 to which it helps to transmit motion through pulley 109 which is keyed to the shaft 44. The length of stitch may be controlled by varying the throw of arm 104. If bolt 106 is moved in slot 107 away from the shaft 44, the arcuate movement of arm 104 and of shaft 44 is increased and the amount of movement of conveyor 24 and the length of stitch 41 are likewise increased. The movement of bolt 106 toward the shaft 44 shortens the length of stitch 41. Shaft 44 is journalled in bearings 108 mounted on rods 110 adjustably supported on frame 20 by sleeve and set screw mountings 111 for adjusting the amount of slack in conveyor 24.

Shaft 44 and conveyor 24 are actuated step-by-step as pulley 109 is moved clockwise by the intermittent action of arm 104. Pulley 109 is stepped forward by a shoe 112 which mounts a renewable liner segment of standard V-belting 113. The end of bolt 106 mounts a bracket 114 on which is pivoted a link 115 the other end of which carries movable pivot 116 which is connected to movable pivot 117 on shoe 112 by link 118. Shoe 112 is biased at pivot 117 by rod 119 and spring 120 which is compressed between bracket 114 and an adjustable nut 121 threaded on the end of rod 19. A set screw 122 provides adjustment for the force applied by liner segment 113 to pulley 109 and also allows for wear of segment 113.

As arm 104 is reciprocated by link 105, it swings freely on shaft 44. Bracket 114 carried by bolt 106 on the end of link 105 reciprocates also and on the forward or clockwise movement of link 104, when link 105 moves to the left, causes liner segment 113 to grip the V face of pulley 109 firmly and carry it along thus rotating shaft 44 through as many as forty-five degrees or as few as five degrees, depending upon the position of bolt 106 in slot 107. On the return stroke when link 105 moves to the right, any reaction between segment 113 and pulley 109 tends to reduce the force acting between the two, so that pulley 109 and shaft 44 remain stationary. It is during this part of the cycle while conveyor 24 is stationary that needle 37 descends with twine 40 through tobacco stems 31 to bobbin 63 and a stitch 41 is made.

As noted, conveyor 24 is stopped momentarily while a stitch 41 is being made, whereas conveyor 24 and its load of tobacco to be stitched are advanced while the needle 37 is in its upward position as shown in FIGURE 2A. To accomplish this action the arm of bell crank 101 connected to link 105 should lie on the same straight line. That is, these elements should be on or slightly above dead center while link 102 and its arm of bell crank 101 are still approaching dead center to provide the desired delay needed for the stitching part of the cycle. During this delay conveyor 24 is stationary. These two dead centers should be approached at somewhat different instants, the interval between which provides the desired delay. The kinematic relationship of bell crank 101 and its connected links 102 and 105 is shown in FIGURE 6 in which the two dead center positions are indicated with the angular relation between the two positions.

The inertia actuated twin cutter 200 is shown in detail in FIGURES 7–11A. Pins 201 are mounted on the under side of conveyor assembly 24 on selected cross bars 33, one pin 201 for each tobacco stick 77, so that pins 201 are a little more than one stick length. As pins 201 are carried forward by movement of conveyor 24 they engage lever arm 202 which is fixed to shaft 203 journaled in arms 204 on the cutter frame 205. Pins 201 may be provided with a plastic coating or renewable covering 206 to reduce noise and improve the operation of cutter 200. Shaft 203 carries forked lever arm 207 keyed or welded thereto, offset from lever arm 202 and bifurcated at 208 to receive pivot pin 209. Arms 202 and 207 are the equivalent of a bell crank and rotate with shaft 203, cutter frame angle member 205 being fixed transversely to frame 20 below conveyor assembly 24 by bolts through holes 220. A twisted link 210 has one end pivoted on pin 209 in bifurcation 208 and the other end pivoted at 211 in the short arm of bell crank fork 212 which is pivoted on twin bars 213 at 214. Pin 209 is biased by tension spring 215 which is anchored to cutter frame 205 at 216.

A guide member 217 is fitted between twin bars 213 and is mounted in spaced relation with cutter frame angle member 205 by bolts 218 and 219. A detent recess 221 on the lower edge of twin bars 213 receives bolt 219. Another guide member 222 is mounted in spaced relation with angle member 205 by bolts 223 and 224 and carries cutter blade holding clip 225 for holding stationary safety knife 226 below the surface 42. Knife 226 may take the form of a single edge razor blade and is readily renewable by sliding an old blade out of clip 225 and inserting a new blade 226 into position. Guide member 222 also fits between twin bars 213 and helps support them for sliding movement. A second recessed detent 227 on bars 213 is positioned to engage bolt 224. Bell crank fork 212 has a pair of upwardly extending arm members which terminate at their free ends in hook-shaped twine engaging fingers 228. Limit pin 229 on twin bars 213 acts to determine the extent of movement of fork 212 and its actuating linkage 209 and 210 under the return action of tension spring 215. Resilient washers 230 of plastic material such as neoprene improve the operation, take up slack and allow both lateral and pivotal motion of the linkage. The use of washers 230 greatly increases the kinematic and machine tolerance allowable in the mechanism which both greatly decreases cost of manufacture and increases the life of the apparatus. Such washers also reduce both wear and noise and are invaluable in the manufacture of farm machinery which is exposed to the elements. Dirt and grit lose much of their abrasive action when these plastics are employed. Where they are used frictional drag is minimized and the pivots do not rust and lock. The pivots can be made substantially self-lubricating. Although not so shown in the drawings it is preferred that most, if not all, pivots and moving parts avoid metal-to-metal contact and that Teflon or neoprene coatings or washers be employed at such points.

As conveyor assembly 24 moves along as indicated in FIGURE 8, one of the pins 201 near the end of a full stick 27 engages arm 202 and rotates it together with shaft 23 and arm 207 in a clockwise direction, pulling link 210 to the left in FIGURE 7 against the action of return spring 215. Link 210 rotates fork 212 clockwise, raising hook-shaped twine engaging fingers 228 above the stitched twine 41. Detent 221, resting on bolt 219 provides enough resistance so that twin bars 213 remain stationary until the lower arm of bell crank fork 212 engages limit pin 229 at which point in the cycle fork 212 ceases to rotate and fork 212 and twin bars 213 are translated to the left, being pulled by link 211 until fingers 228 overlie stitches 41 and knife 226. This movement continues until detent 227 engages bolt 224 and pin 201 slips off the end of arm 202. The above movement took place against the action of spring 215 and increased the return force exerted by that spring on pivot 209. Spring 215 tends to rotate pivot 209 in a counter-clockwise direction and moves link 210 to the right. This force is transmitted to moving pivot 211 and tends to rotate fork 212 counter-clockwise about pivot 214 on twin bars 213. As detent 227 is in engagement with bolt 234 movement of bars 213 is resisted and fork 212 is rotated counter-clockwise on stationary bars 213, snapping the spaced fingers 228 down on stitches 41 which are thereby pressed against the cutting edge of knife 226, as shown in FIGURE 11A. At this point fork 212 engages limit pin 229 and counter-clockwise rotation of fork 212 and fingers 228 is halted. The force of extended spring 215 is then transmitted to bars 213 through the pivot 214 and limit pin 229 simultaneously and is sufficiently great to disengage detent 227 from bolt 224 and move the bars 213 and fingers 228 to the right in translation, dragging twine stitches 41 to the right across and against the cutting edge of knife 226 as shown in FIGURE 11A. Twine 41 is cut and the full stick 27 with the load of stitched leaves 26 is racked or piled.

Cross bars 33 mounting pins 201 provide a rigid positive means for actuating the twine cutter. After stitch 41 is cut spring 215 continues to move bars 213 and fork 212 to the right until detent 221 engages bolt 219 and movement of bars 213 is arrested. Twine cutter 200 is in position for the next cutting cycle.

The end of cross bar 33 opposite pins 201 mounts a conveyor guide pin 231 which rides on adjustment plate 232 positioned directly opposite arm 202 to assure firm positive operation. An adjustment screw 233 is provided to adjust for wear. The dual fork arrangement 212 as shown in FIGURE 9 takes up the slack in twine 41 and makes cutting easier and positive. The arrangement provides the double cutting action of initial impact which forces the twine 41 sharply against the cutting edge of knife 226 followed by the slicing or sawing action when fingers 228 pull the taut twine along the cutting edge. Even a dull knife is effective and enjoys a long life with this construction.

Figure 1B:
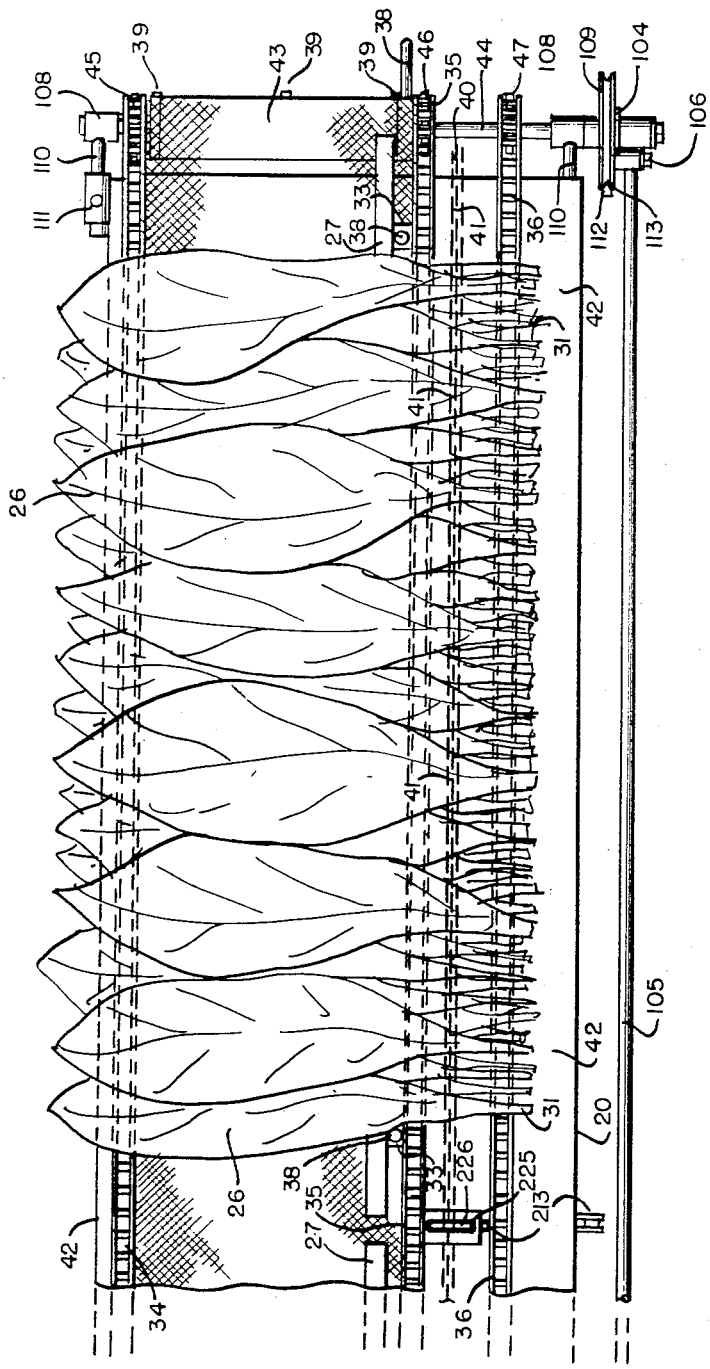

Although FIGURES 1A and 1B show only half the looper mechanism, the half of the left of the center line as shown in FIGURE 1 provides sufficient length to lay tobacco bundles or leaves 26 for at least two tobacco sticks and prepare them for stitching as described above. Take-up bearings for conveyor 24 are provided at the end and may duplicate elements 110 and 111. Both the bobbin assembly and the twine cutter are preferably enclosed in shields indicated generally at 234 which are carried by and treated as part of frame 20. The shielding 234 is removable by the slackening of a few screws and the slack composite conveyor 24 may be pulled to one side to provide ready access to the bobbin 63 or twine cutting assembly 200. A twine tensioning device 235 feeds twine 40 from the supply to needle 37 at a desired tension which is adjustable within suitable limits. The stitch-forming action of needle 37 and bobbin 63 are shown step-by-step in FIGURES 12A through 12F inclusive. Bobbin 63 is mounted on the end of shaft 61 with the center of the shaft on the curved surface below point 86 or hook 87. Both shaft 61 and bobbin 63 are cut away to provide clearance and a twine-holding curved hollow below point 86. Needle 37 is at the bottom of its stroke in FIGURE 12A carrying twine 40 with it. Bobbin 63 is not plane, point 86 being bent or curved below the plane of the paper to pass behind and very close to needle 37 so that point 86 passes through the bight of twine 40 formed by the eye of the needle in point 86. Hook 87 curves upwardly toward the plane of the paper and trailing lobe 88 is bent only slightly above the plane of the paper, so that bobbin 63 may be said to have a certain pitch or lead somewhat after the manner of a propeller, but uneven. Hook 86 holds the loop or bight 89 of twine 40 as needle point 78 withdraws. Bobbin 63 rotates simultaneously with the needle withdrawal and the loop 89 of the thread 40 slides down the curved side of hook 87 below point 86, the loop 89 being held by lobe 88. Looped twine 40 is pulled taut around bobbin 63 as needle reaches its raised position. Conveyor 24 advances only during that part of the cycle when needle point 78 is above the composite belt 32, 35, and carries stems 31, bunched or singly, against the twine 40 and past the arc of travel of needle 37. Bobbin 63 continues to rotate counter-clockwise and carries the loop in twine 40 with it. Needle point 78 begins to descend a second time, carries twine 40 with it and drapes the twine 40 around the stems 31. Conveyor 24 has ceased advancing as point 78 approaches it. As needle point 78 descends past conveyor 24 toward shaft 61 and bobbin 63 it draws the new loop 90 around the encircled stems 31 which are held in position by the stationary conveyor belt 24. Lobe 88 continues to rotate as needle point 78 descends and holds loop 89 reasonably tightly as loop 90 is completed. Loop 89 is now held on the back side of bobbin 63 between hook 87 and lobe 88. As needle reaches the bottom of its stroke, bobbin point 86 again enters the space between needle 37 and twine 40, now loops 90, just above the eye while loop 89 is held by rear point 91 of hook 87. Point 86 thus draws a third loop 92, the trailing twine of which passes through loop 89. As loop 92 is drawn by rotation of point 86, loop 89 slips off rear point 91 and tightens loop 90 around stems 31 as loop 92 is pulled larger by rotation of hook 87. When needle point 78 is well above conveyor 24 and stems 31 are again advanced against the taut twine of new loop 92 and the process is repeated to form successive chain loops 92, 93, 94, et cetera, which stitch or loop bundles of stems 31. When the loops are pulled tight they are in a sense self-locking because the twine is rough and grips itself so tightly that friction holds the loops securely when the twine 40, 41 is cut by cutter 200. Stems 31 are somewhat compressed by the loops and the resilience of the stems bundles maintains the necessary tension on the twine to "lock" the loops. The tension on twine 40 is adjusted at 235 so that there is no danger that the twine will cut through any of the stems 31 or cause the leaves to fall from a fully strung stick 27 when being racked, transported or hanging in a curing barn.

Simplifier FIGURES 12A–12F, described above, omit stick 27 and represent a step-by-step looping sequence operation by needle 37 and bobbin 63. Simplified FIGURES 12G–12I omit the stick 27 and are drawn to larger scale to clarify the details of needle and bobbin structure and how they cooperate. FIGURE 12G shows the pulling out of a loop 89 as needle and bobbin separate. Loop 89 has slipped around bobbin 63 until it is held by lobe 88 until point 86 draws the next loop 90 through loop 89 as shown in FIGURE 12H. This figure shows clearly how bobbin 63 is a curved twisted surface and how the point 78 of needle 37 is cut away so that they can cooperate. The bundle of stems 31 holds loop 90 which surrounds them and the loop 89 pulls out for lack of stems 31 as may be readily understood for FIGURE 12I. The twine 40 leads through the eye in point 78, a loop 155 in tension spring 156, tension device 157 and is drawn from twine supply 158.

FIGURES 14A and 14B illustrate the sewing action of a vertically reciprocating needle 400. It will be seen that the looped bundles 401 are relatively flat where the guard wheel 77 presses the loops flat against support 175. Stick 27 tends to accentuate the flatness as shown at 402. As a result, the looped bundles 401 are packed densely together at 403 on one side and air does not circulate readily.

Where the curved needle 37 of the present invention is employed, the looped bundles 404 of leaves 26 are rounded as at 405 above and below stick 27 by the side pull of curved needle 37 on twine 40 at 406. The rounding at 405 on both sides of stick 27 allows air flow at 407 and promotes even drying of the tobacco. This action is particularly important where heated air under forced draft is used to cure the tobacco. Uneven drying means uneven curing with the result that both time and tobacco are lost. Certainly best results are not obtainable under such circumstances.

Because of the light weight of the needle assembly it could be pivotally mounted below the conveyor chains and reciprocated in the same plane with conveyor chain to allow for proper stitch length on a continuously moving conveyor belt. For assembly, the cutting knife 226 could be so positioned on the frame with respect to the composite conveyor 24 and the stitched twine 41 that the act of removing a filled tobacco stick 27 from conveyor means 24 draws the stitched twine 41 across the knife edge 226 and cuts the twine 40. As noted above, the friction of the twine 40 and stitches 41 when pulled tautly against itself is sufficient to lock the last stitch 41 effectively on the tobacco stick 27.

It will be seen that the above construction reduces the cost of the mechanism to less than half that of a looping mechanism using a reciprocating load. The elimination of the cross-head which requires expensive machinery and subjects the entire assembly to a reciprocating line load of much larger amplitude than the curved needle arrangement with its arcuate path reduces the overall weight of the apparatus to less than half. In addition, adjustment to compensate for wear is eliminated from this part of the equipment. The replacement of a few inexpensive bushings will renew a worn machine. An oil reservoir is not required and the elimination of sliding precision parts greatly reduces the abrasive action of grit and dirt which are carried by the tobacco leaves.

The two-wheel, narrow frame construction makes transportation by road easy and the apparatus may be placed in operation quickly. The longer end of the frame is supported by a movable leg 150 which is adjustable in length and pivoted so that it may be swung flat and locked against the bottom of frame 20 when the apparatus is being transported. A stick rack 151 for holding a supply of tobacco sticks 27 above back board 25 is carried by frame 20. Chain 36 may be shortened so as to run only about a foot beyond the cutter 200 and sprocket 47 may be mounted to run free on a stub shaft. Chain 36 would then be driven by the sprocket keyed to shaft 152 at the other end of the frame 20.

Guard wheel 77 is preferably weighted so that when in guard position it also serves to hold the leaves 26 and particularly the stems 31 in place during the stitching operation and while the needle 37 is being raised from the tobacco and drawing the thread 40 with it.

The form of belt advancing means shown in FIGURES 2D–2G is simple and is capable of reverse action. Crank 300 is journaled at one end in a bearing 301 mounted on top of arm 104 above shaft 44. Bearing 301 is moved by the rotation of arm 104 and moves crank 300 with it. The other end of crank 300 is journaled in a bearing in the top of shoe 112 carrying liner segment 113 which is in engagement with pulley 109. As shown in FIGURE 2F when shoe 112 and crank 300 are on the left side of pulley 109, reciprocation of link 105 rotates pulley 109 clockwise and moves the conveyor 24 to the right. When the shoe 112 is on the right side of pulley 109 as shown in FIGURE 2G, pulley is rotated counter-clockwise and conveyor 24 is moved to the left so that the machine can be adjusted or serviced without removing tobacco already looped on sticks in process.

While there have been described above what are presently believed to be the preferred forms of the invention, variations thereof will be obvious to those skilled in the art and all such changes and variations which wall within the spirit of the invention are intended to be covered by the generic terms in the appended claims, which are variably worded to that end.

We claim:

1. In combination with conveyor means for transporting material and an automatic mechanism for operating on said material, drive means for intermittently driving said conveyor means in synchronism with said automatic mechanism, said means comprising:
   (a) a frame, upon which the conveyor means and the automated mechanism are mounted,
   (b) a driven rotary member mounted on said frame,
   (c) a first mechanical linkage means connected to said driven rotary member for actuating the automatic mechanism,
   (d) a rotating wheel mounted on said frame to drive the conveyor means,
   (e) a second mechanical linkage means having an alternating rotating arm with a shoe member mounted thereon to make contact with and work against a portion of said wheel during one half of the alternating cycle and adapted to be free of contact with said wheel during the other half of said cycle,
   (f) a third mechanical linkage connected to said driven rotary member and adapted to translate reciprocating motion to said alternating rotating arm,
   whereby, the rotating wheel moves the conveying means during only one half of the reciprocating cycle, while the automatic mechanism operates on the material during the other half of the reciprocating cycle.

2. A combination as claimed in claim 1 wherein said rotating wheel is further defined as a belt sheave, said shoe member having a work surface that corresponds to the belt sheave work surface to increase the frictional work area between the shoe member and the sheave.

3. A combination as claimed in claim 1 wherein said second mechanical linkage is further defined as
   (a) a shaft mounted on said frame,
   (b) said rotating wheel mounted on said shaft, (c) an adjustable linkage crank rotatably mounted on said shaft adjacent said rotating wheel, (d) said third mechanical linkage further including a reciprocating connecting rod connected to said linkage crank to vary the rotation applied to said crank according to the linkage crank adjustment, and (e) said alternating rotating arm mounted on said linkage crank and adapted to make frictional contact with and work against a portion of said wheel during one half of the alternating cycle and adapted to be free of contact with said wheel during the other half of said cycle.

4. In combination with conveyor means for transporting work pieces and an automatic mechanism for operating on said work pieces, a driving mechanism for intermittently driving said conveyor means and for actuating said automatic mechanism, said drive mechanism comprising:

(a) a frame upon which the conveyor means and the automatic mechanism are mounted, (b) a first rotating member rotatably mounted on said frame, (c) a second rotating member rotatably mounted on said frame to advance the conveyor means;

(d) a first mechanical linkage means for actuating the automatic mechanism, said first mechanical linkage means connected to said first rotating member to transform the rotational motion of the first rotating member to substantially reciprocating motion and thereby actuate an automatic mechanism;

(e) a second mechanical linkage connected to said second rotating member to translate reciprocating motion received by it to rotary motion and apply the rotary motion to said second rotating member;

(f) a third mechanical linkage connected to said first mechanical linkage to transmit the substantially reciprocating motion to said second mechanical linkage, said linkage including a bell crank which arrives at dead center while the automatic mechanism is operating on the work pieces;

whereby, the conveyor means pauses momentarily while the bell crank of the third mechanical linkage reaches dead center to allow the automatic mechanism to operate on the work pieces.

5. In combination with conveyor means for transporting work pieces and an automatic mechanism for operating on said work pieces, a driving mechanism for intermittently driving said conveyor means and for actuating said automatic mechanism, said drive mechanism comprising:

(a) a frame upon which the conveyor means and the automatic mechanism are mounted, (b) a first rotating member rotatably mounted on said frame, (c) a second rotating member rotatably mounted on said frame to advance the conveyor means;

(d) a first mechanical linkage means for actuating the automatic mechanism, said first mechanical linkage means connected to said first rotating member to transform the rotational motion of the first rotating member to substantially reciprocating motion and thereby actuate an automatic mechanism;

(e) a second mechanical linkage connected to said second rotary member, said linkage having an alternating rotating arm having a shoe member in contact with and working against a portion of said second rotary member during one part of the alternating cycle and being free of contact with said wheel during the other part of the cycle, whereby the reciprocating motion received by said second mechanical linkage is translated to rotary motion and applied to to said second rotating member;

(f) a third mechanical linkage connected to said first mechanical linkage to transmit the substantially reciprocating motion to said second mechanical linkage, said linkage including a bell crank which arrives at dead center while the automatic mechanism is operating on the work pieces;

whereby, the conveyor means pauses momentarily while the bell crank of the third mechanical linkage reaches dead center to allow the automatic mechanism to operate on the workpiece.

References Cited
UNITED STATES PATENTS

| | | | |
|---|---|---|---|
| 2,235,122 | 3/1944 | Shaw | 74—230.17 |
| 2,518,965 | 8/1950 | Whitley | 214—5.5 |
| 2,538,698 | 1/1951 | McNeill | 214—5.5 |
| 2,689,484 | 9/1954 | Phares | 74—230.17 |
| 3,122,933 | 3/1964 | Rodgers | 74—230.17 |
| 3,128,800 | 4/1964 | Faerber | 198—135 X |

HUGO O. SCHULZ, *Primary Examiner.*